Aug. 30, 1966  W. F. O'CONNOR  3,269,184
APPARATUS FOR MEASURING FLUID CHARACTERISTICS
Filed April 24 1964  3 Sheets-Sheet 1
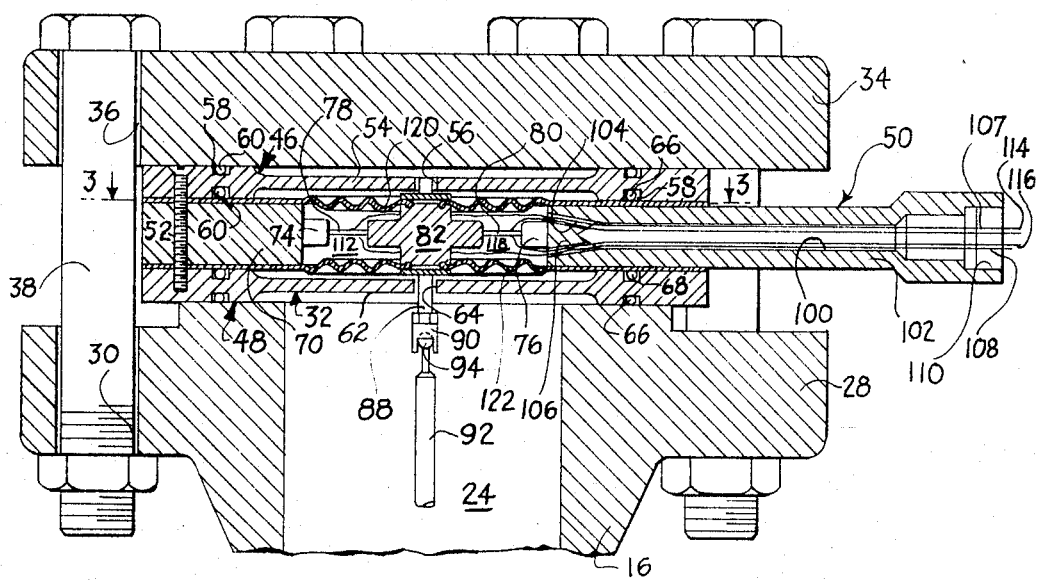
FIG. 2
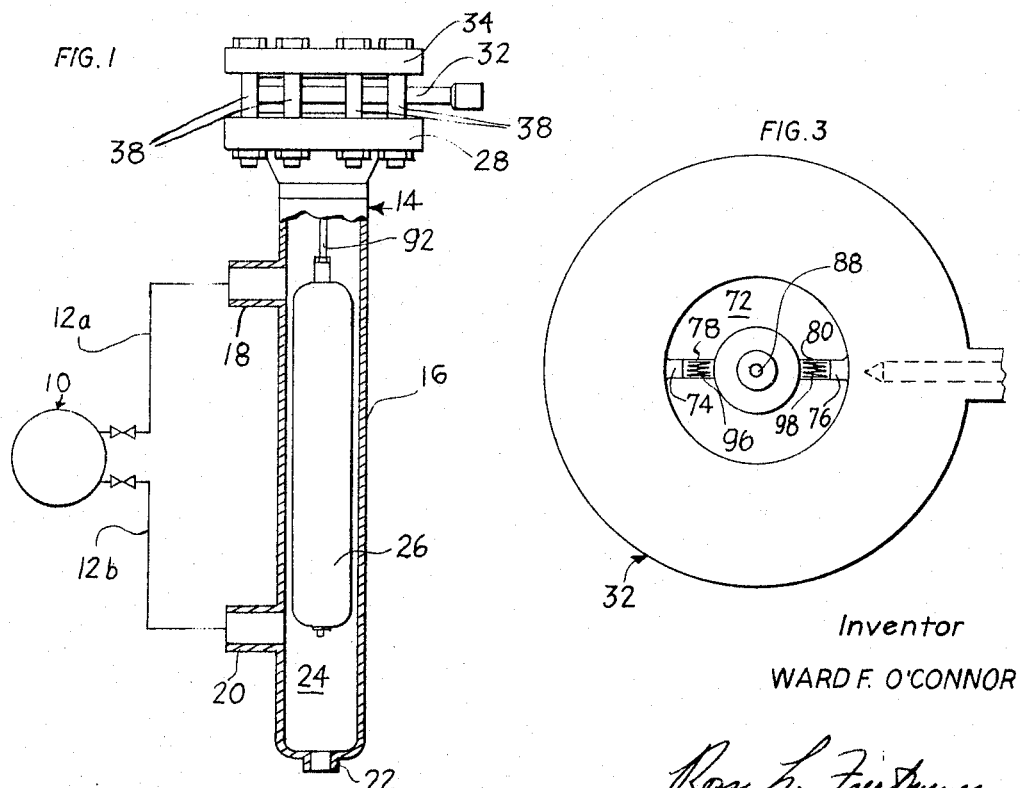
FIG. 1
FIG. 3
Inventor
WARD F. O'CONNOR
By Ross L. Fouthmeyer
Attorney

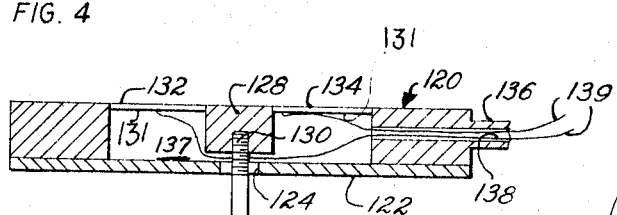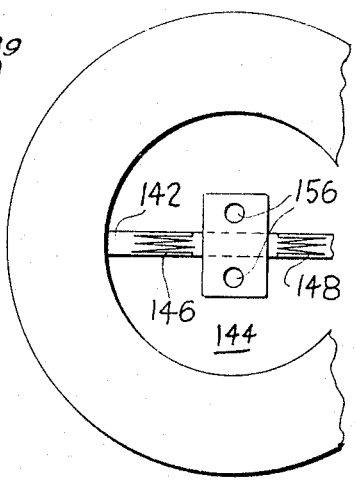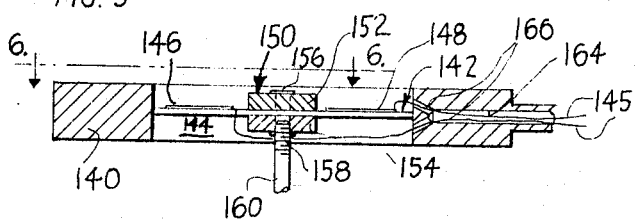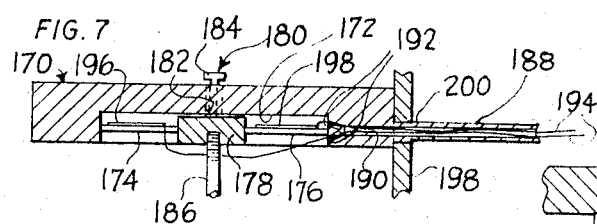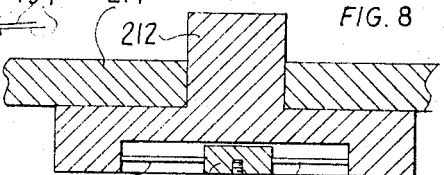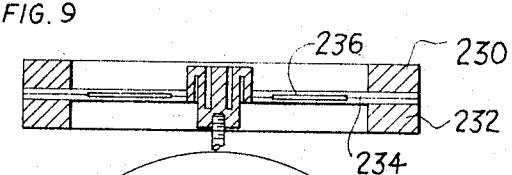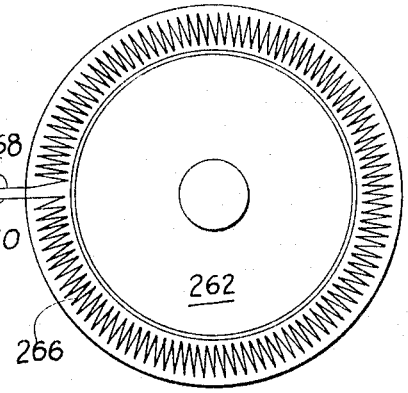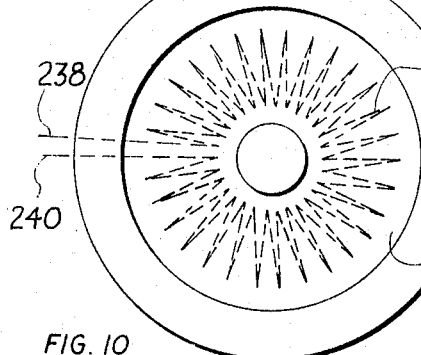
Inventor
WARD F. O'CONNOR
By Ross L. Foerthmyer
Attorney United States Patent Office 3,269,184
Patented August 30, 1966

3,269,184
APPARATUS FOR MEASURING FLUID
CHARACTERISTICS
Ward F. O'Connor, Deanville, N.J., assignor to The Lummus Company, New York, N.Y., a corporation of Delaware
Filed Apr. 24, 1964, Ser. No. 362,443
7 Claims. (Cl. 73—309)

This invention relates to an apparatus for measuring the density or displacement characteristics of a fluid to provide indications of such characteristics remote from the measuring element, and more particularly, to a resistance type strain measuring device.

In order to known certain characteristics, such as the liquid density or the liquid level of a fluid body in processing equipment, it is common to provide optical measuring devices in the form of liquid level gauges wherein the liquid level or fluid density of the liquid may be determined by visual observation at a point adjacent such processing equipment. In the large processing apparatus presently used in industry, in many instances, it is impossible to make direct visual observations of the liquid level or other characteristics of the liquid at the various points in the processing equipment. Even if such points are accessible to the operators, it is much more desirable to have multiple indications of the various characteristics of the fluid passing through the processing equipment conveniently shown at one central point which is usually remote from the processing equipment itself. In order to provide for remote indication of fluid characteristics, there have been developed various instruments including electrical means for remote signaling of the instantaneous fluid characteristics at one or more stations along the processing equipment. A conventional method for determining the specific gravity of a liquid or the liquid level of said liquid within processing apparatus is to employ a float of predetermined mass and volume which is wholly or partially submerged in the liquid whose characteristics are to be determined. The resulting force of displacement by the liquid on the float is therefore a measurement of the liquid level or specific gravity of the liquid displacing the float, and various electrical means have been provided for indicating the displacement force on the float at a point some distance from the float itself.

It is therefore a primary object of this invention to provide an improved apparatus for measuring float displacement characteristics of a fluid in which the measuring element or transducer and the displacement element may be both mounted directly in the vessel or chamber forming a portion of the process equipment thereby totally eliminating errors in measurement due to the normal remote location of the measuring element from the chamber containing the float.

It is a further object of this invention to provide an improved apparatus for measuring the displacement characteristics of a fluid in which the float is directly coupled to an electrical transducer in the form of a strain element and in which the direct mechanical force provides a uniform signal from the strain measuring element.

It is a further object of this invention to provide an improved apparatus of this type in which the extremely small motion of the fluid displacement element needed to effect the desired output signal permits guiding of the float with a minimum effect on accuracy.

It is a further object of this invention to provide an improved apparatus of this type in which the strain element may be easily protected from the atmosphere of the chamber carrying the fluid whose characteristics are to be measured.

It is a further object of the invention to provide a measuring system of this type suitable for remote electrical indication which consumes extremely small amounts of power, operates for long periods of time, is intrinsically safe electrically, may be operated in hazardous areas, and requires minimum maintenance.

Further objects of this invention will be pointed out in the following detailed description taken in conjunction with the accompanying drawings which disclose, by way of example, the principles of the invention, and the best modes which have been contemplated for applying such principles.

In the drawings:

FIGURE 1 is a side elevational view partially in section of one form of the apparatus of the present invention, and schematically illustrates the apparatus operatively connected to a processing vessel for liquid phase measurement.

FIGURE 2 is an enlarged side elevational view of a portion of the apparatus of FIGURE 1, in section, showing in detail the transducer portion of the apparatus.

FIGURE 3 is a top plan view of a portion taken along lines 3—3 of the embodiment shown in FIGURE 2 showing the transducer and its method of mounting.

FIGURE 4 is a side elevational view, in section, of a second embodiment of the present invention showing an alternate method of mounting the transducer.

FIGURE 5 is a side elevational view in section, of a third embodiment of the present invention.

FIGURE 6 is a top plan view of a portion of the apparatus shown in FIGURE 5.

FIGURE 7 is a side elevational view, in section, of a fourth embodiment of the present invention.

FIGURE 8 is a side elevational view, in section, of a fifth embodiment of the present invention.

FIGURE 9 is a side elevational view in section of a sixth embodiment of the present invention.

FIGURE 10 is a top plan view of the embodiment shown in FIGURE 9.

FIGURE 12 is a top plan view of the embodiment shown in FIGURE 11.

Figure 11:
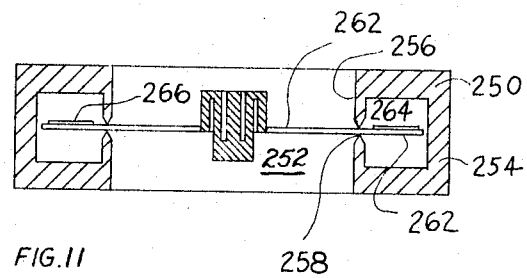
FIGURE 11 is a side elevational view, in section, of a seventh embodiment of the present invention.

In general, the apparatus for the present invention comprises means for measuring the float displacement characteristics of a fluid and includes a float with means for supporting the float within a main fluid body for limited upward displacement therein. Means are further provided for directly attaching the float to a strain measuring element concentrically thereof whereby the measuring element is stressed uniformly as a result of minute fluid displacement of the float to provide maximum accuracy of measurement.

Referring to the drawings, there is schematically shown in FIGURE 1 a relatively large fluid vessel 10 which may form a part of a processing complex wherein it is desirous to provide some remote indication of the fluid characteristics of a fluid body within the vessel 10.

The present invention as directed to the provision of a measuring device or apparatus, generally indicated as 14 which is in fluid communication with the body of fluid in vessel 10 through lines 12a and 12b. The measuring device 14 is provided with the electrical transducer therein for producing an electrical signal indicative of the fluid characteristics of the main body of fluid in the vessel 10. The measuring apparatus 14 includes an elongated cylindrical housing 16 of generally thin walled construction and having a pair of spaced lateral side ports 18 and 20 and/or a bottom port 22 as is conventional in the art. The fluid freely circulates within chamber 24 formed within the cylindrical container 16 and is in contact with an elongated cylindrical float or displacer 26.

In practice, the float 26 may be made from tubing of the nearest commercially available standard diameter size length as to displace approximately one to two pounds of water. The float may be weighted to a density of approximately 1.1 although it is obvious that the other float displacements and densities may be practical and necessary.

In one sense, the housing member 16 acts as a vertical guide for float 26 thereby substantially restricting any lateral movement but allowing for vertical or upward and downward forces on the float 26 within chamber 24 as a result of the displacement of float 26 within the body of fluid in the chamber 24. It is to be noted that the float displacement apparatus of the present invention is physically coupled and positioned in sealed relationship to the housing member 16. The upper portion of the cylinder 16 is provided with a radial flange 28 as indicated in FIGURE 2 through which is drilled a plurality of holes 30. An electrical transducer or measuring device comprising an assembly generally indicated at 32, is positioned between the flange 28 and a cover 34 formed of like material as member 16. The cover 34 has a plurality of holes 36 in similar radial disposition as the holes 30 in the flange 28, such holes being adapted to receive bolts, generally indicated at 38.

The assembly 32 is positioned between the cover 34 and the flange portion 28 of the cylindrical housing 16 in sealing relation thereto. In this regard, the assembly comprises upper and lower annular members or elements 46 and 48 which act to sandwich an intermediate annular strain gauge support member 50 therebetween. It is to be noted that the three annular members 46, 48 and 50 are clamped together and suitably held in position by a plurality of fasteners, one type of which is shown at 52 as a threaded screw. It is understood that other means may be utilized to hold in position the members 46, 48 and 50. As illustrated in FIGURE 2, these elements are clamped in assembled position.

The upper annular member 46 is provided with a center section 54 of reduced cross section and includes a central opening 56 formed therein. Further, annular slots 58 are formed on each side of the annular element 46 and act to receive suitable O rings or like sealing members 60 for providing a fluid tight seal between the elements forming the assembly. Likewise, the lower annular element 48 has a center section of reduced cross section 62 having a central opening 64 and further includes annular slots 66 formed on either side thereof radially outward of the reduced cross sectional portion 62 for receiving sealing elements such as O rings 68 to provide a fluid tight seal at this point.

The central annular element 50 acts as the radial support member for the strain gauge type transducer and in this respect comprises an outer annular section 70 which is perfectly rigid and is fixedly located between the housing 16 and cover 34 by the annular member 46 and 48 and is sealed through the use of the sealing elements such as O rings 60 and 68. A relatively large central opening 72 is provided within the annular member 50 as indicated in FIGURE 3. The annular member 50 includes a pair of inwardly directed bosses 74 and 76 positioned diametrically opposite one another about the periphery of the annular opening 72.

The bosses 74 and 76 are provided with relatively thin extension sections 78 and 80 forming flexure elements which connect to and support centrally of opening 72 a cylindrical block, generally indicated as 82. The block 82 includes a centrally located means for receiving a rod-like member 88, the rod 88 including at its lower end a socket connecting member 90 allowing attachment to a connecting rod 92 affixed to the float 26, as indicated in FIGURE 1. The connecting rod 92 includes a ball member 94 at its upper end allowing for a slight pivoting movement between rod 26 and the rigidly held rod 88. Rod 88 extends through opening 64 in member 32, block 82, and into central opening 56 in annular member 46, which openings act as annular guides for rod 88. Other shapes or methods of flexure may be employed. It is apparent therefore that longitudinal or axial movement of float 26 within guide cylinder 16, as a result of fluid displacement, results in axial movement of the block 82 and uniform deflection of the concentric strain gauge mounting members in the form of the thin flexure connecting elements 78 and 80.

Conventional electrical strain gauge elements may be positioned on either surface or mounted within the elements 78 and 80. As an example, there is shown in FIGURE 3, the placement of one strain gauge element 96 on the left hand flexure element 78, and strain gauge element 98 on the right hand flexure element 80 on the upper surface thereof. In order to connect the strain gauge elements to the respective sources of electrical current there are provided within the large annular element 50 a central bore 100 which passes through extended portion 102 of the element 50 and terminates short of the boss 76. A pair of diagonal, relatively thin connecting ports 104 and 106 allow the thin electrical wires 107 and 108 constituting the leads to the strain gauge 96 to be passed from opening 110 exterior of the device through the central bore 100 and through the respective inclined bores 104 and 106 to a chamber 112 for connection to the resistance strain gauge element 96. In like manner, leads 114 and 116 extend from opening 110 through the large bore 100 and the respective small bores 104 and 106 to their points of connection within chamber 118 to the resistance strain gauge element 98. The leads 114 and 116 are effectively sealed in bores 100, 104, and 106.

The chambers 112 and 118 are formed through the use of a pair of relatively thin resilient diaphragms 120 and 122 which are coupled at their inner ends to the upper and lower ends of block 82 and clamped at their outer ends between the annular member 50 and the annular members 46 and 48. The resilient diaphragms 120 and 122 may be formed of metal, plastic, fabric or other such material, as is consistent with the proper operation of the gauge.

Thus, the electrical transducer elements in the form of thin resistance type strain gauges 96 and 98 are protected from the environment within chamber 24 through the use of the upper and lower diaphragms 120 and 122. The electrical leads 107, 108 and 114 and 116 are coupled to conventional remote indicators (not shown) and utilize small electrical currents or voltages. Conventional strain measuring devices are well known in the art, and may include Wheatstone Bridge or other type circuits employing fixed resistances while the resistance elements 96 and 98 may form variable resistances which may be coupled additively in the electrical circuit. Thus, the measuring element is designed to consume very small amounts of power.

A variety of power sources may be utilized, any low energy power cell or emergency power source can be used for long periods of time. A practical design to provide safety in industrial service is to use a strain element of nominal resistance in the order of 250 to 350 ohms. The elements may be excited by either a constant voltage or a constant current where lead length and ambient conditions may cause error. The excitations may be either alternating current or direct current or half wave alternating current. Practical voltages and direct current levels may be up to 20 volts and up to 30 milliamps, respectively, to provide the benefits expected industrially.

With the exception of the method of placement of the strain gauge flexural elements and their concentricity with respect to the mechanical deflecting device, the operation of the strain gauges are quite conventional. It is apparent that as a result of variation in fluid density of the fluid body of liquid within chamber 24, or as a result of liquid level change if the device is used as an indication of liquid level, the force of displacement on the float 26 is transferred through rod 92, ball and socket connections 90 and 94 to the actuator rod 88 which results in a slight upward or downward deflection to the block 82. As a result, slight mechanical deflection occurs in flexure elements 78 and 80 which results in a variation in the resistance of the strain gauge elements 96 and 98 resulting in a variation in output of the electrical signal emanating from these elements.

The distance from the top of the float or the center line of orifice 18 and the plane of the transducing elements 96 and 98 may be varied to provide a radiating section above the top process connection to the displacer, if the displacer or float 26 is used in a system indicating a liquid level somewhere intermediate of fluid ports 18 and 20. The technique of installing the measuring element, that is, the transducer section 48 above the fluid displaced float member 26 provides a space for the collection of vapor, the low rate of heat transfer of the vapors provides temperature overrange protection to the transducer or measuring element for continuous operation on services where the fluid temperatures are well above or below the desired temperature of the measuring element. This technique also reduces temperature errors, thermal stresses and acts to extend the operating life of the device even though the device is advantageously associated directly with the main body of liquid 12 in the processing equipment.

While the measuring element and its displacer is mounted directly in a vessel or chamber associated with the liquid processing equipment, it may also be connected to the processing equipment in the manner of a displaced conventional float chamber through conventional liquid connecting conduits and provide all of the same benefits as that of the first embodiment shown in FIGURES 1 through 3. The use of the flexible diaphragms 120 and 122 to seal the strain gauge transducing element 96 and 98 within the chambers 112 and 118 is only one method by which isolation of the transducer may be accomplished. Obviously, any conventional method of sealing a measuring element from exposure to vapors or liquids may be utilized as well as for providing mechanical overrange protection to the element.

The measuring elements in the form of the separately positioned and separately connected strain gauge elements are merely examples of one method on which the transducing elements may be concentrically positioned with respect to the fluid displacement element 26. The strain measuring element itself may be of many different shapes and many different materials, bonded, unbonded, semi-bonded, welded, printed, photographically applied, sputtered, vacuum deposited, etched or combinations thereof with respect to the flexure support members such as those indicated at 78 and 80 in the first embodiment.

Likewise, the present device is designed to operate under a very wide range of temperatures and pressure conditions and the illustrated embodiment operates satisfactorily at temperatures between about −100° F. to about 800° F., and at pressures up to 5000 p.s.i.g. A specific aspect of the present invention is the method of supporting the strain element concentrically of the float whereby a small deflection results in a symmetrical stress to the deflectable strain gauge support to produce a highly accurate output signal for delivery from the electrical strain gauge to the demote indicator.

The arrangement for mounting the strain element of FIGURE 4 forms a second embodiment of the present invention. In this case the annular support member 120 includes a much thinner annular member 122 which has a central aperture 124 through which actuator rod 126 attached to the float projects and is coupled to a vertically deflectable mounting block 128 by a simple connection indicated at 130 as threaded. The block 128 is attached to the larger annular support member 120 by relatively thin rectangular flexure sections 132 and 134 which carry the strain elements bonded thereto or supported by the manner indicated previously. Again, the outer end of the main annular member 120 includes an extension arm 136 which is bored at 138 to receive the thin electrical leads 139 passing from the remote indicating device and the remainder of the measuring system (not shown) to the strain elements 131 carried by the flexure sections 132 and 134, the lead being carried out through port 138 and effectively sealed from the chamber section indiacted at 137.

The third embodiment shown in FIGURES 5 and 6 is quite similar to the embodiment of FIGURE 1, with the exception that there are no flexible diaphragms positioned on either side of the flexure elements for providing a working chamber in a protective atmosphere. In this respect, the annular member 140 includes a simple, single element flexure section 142 which extends completely across the opening 144 formed within annulus 140, and provides a thin rectangular base for supporting strain elements 146 and 148 positioned on opposite sides of a multiple element block member 150. The block member comprises two parts, 152, and 154, which act to sandwich the flexure element 142 at the center thereof, these elements being coupled together by suitable rivets indicated at 156. The bottom block 154 has a central aperture 158 which receives the end of the coupling rod 160 which is attached to a displaceable float (not shown). The leads 145 to the strain gauge element 146 and 148 pass through the large bore 164 and the small inclined bores 166 as is shown in the principal embodiment.

The fourth embodiment is shown in FIGURE 7, in which the main rectangular or annular support member 170 includes a relatively large recess 172 for receiving the transverse flexure elements 174 and 176 which are joined at the center by block member 178 having an extending portion in the form of a T-shaped element 180 passing upwardly through an aperture 182 formed centrally of the block 170. The horizontal portion 184 of T-shaped element 180 acts as a deflection block for restricting downward deflection of the block member 178 and its associated shaft 186 which is coupled directly to the float (not shown). In like manner to the previous embodiments, the large support element 170 includes extension 188 on one side and includes large central bore 190 terminating in a pair of inclined bores 192 through which passes the lead wires 194 to the respective strain gauge element 196 and 198, bonded or otherwise attached to the respective flexure sections 174 and 176. In this case, it is to be noted that the extension section 188 may be advantageously utilized as the mechanical connection between the measuring apparatus including the float, its support and the transducer support and the container within which it is positioned.

The container wall is shown in 190 and includes an opening or aperture 200 through which projects the extension 188 of member 170. Suitable sealing means which may be in the form of a gasket 202 surrounds the supporting portion 188, the outer end of which projects through the wall. Of course, this teaching is only schematic and additional structure may be employed to insure against vertical deflection or movement of the support member 170 with respect to the container in which it is positioned.

FIGURE 8 illustrates an alternative arrangement in which the support member 210 is provided with a central extension 212 allowing static installation by coupling to a horizontal cover or wall section other than a vertical wall section as indicated in the embodiment of FIGURE 7. Thus, a cover member or upper wall 214 includes at least one opening. Without showing the position of the strain gauge elements, it is to be noted that the flexure portions 220 and 222 are coupled to a deflectable block 224 in somewhat the same manner as the principal embodiment whereby a minute vertical deflection of actuator rod 226 results in equal deflection of symmetrically mounted strain elements positioned on flexure elements 220 and 222.

Instead of providing a strain element fixed to relatively thin rectangular flexure members positioned at 180° with respect to each other on either sides of a centrally located oscillating block within a cavity of some type formed within an annular support member, it may be desirable to provide a circumferential strain element which is physically supported by a flexible diaphragm or like support member in which axial deformation of the diaphragm by an actuating rod coupled to the center thereof and to the float (not shown) will result in concentric, symmetrical deflection of the strain element through its support member to provide a sizeable output signal for extremely minute deflections by the float. Reference is made to the embodiment of FIGURES 9 and 10 which illustrates an annular support member comprising a pair of annular rings 230 and 232 which act to clamp a resilient diaphragm or diaphragms 234 of metal or other material therebetween, having imbedded therein a resistance type strain element 236 having leads 238 and 240 connected to appropriate ends of the strain element or elements 236. An actuating rod (not shown) is connected centrally of the diaphragm to provide the necessary deflection to effect changes in the characteristics of the strain gauge element 236. The method of supporting the strain element assembly of this embodiment may take the form of any of the types shown in the previous embodiment.

In the embodiments of FIGURES 11 and 12, the strain element assembly is quite similar to that shown in FIGURES 9 and 10 with the exception that the strain gauge element is physically located at a radial position exterior to the point of contact between the outer ends of the flexible diaphragm and its support block. In this case, support block 250 takes the form, in cross section, of a C having a hollow center 252 and includes an outer continuous wall 254 and an inner wall 256 having a central opening at 258, and has a free peripheral portion 262 positioned within a cavity 264 formed by the annular support member 250. Upon the surface of diaphragm 260 within the annular cavity 264 is positioned a strain element 266 which may be bonded to or affixed to the upper or lower surface or both of the diaphragm 260 by any one of the aforementioned methods. Again, leads 268 and 270 extend radially away from the annular support member 250 for connection to the remote indicating means (not shown), including a suitable source of power. In like manner to the embodiment shown in FIGURES 9 and 10, an actuating rod (not shown) depends therefrom for effecting the suitable deflection to the diaphragm 260 which is completely uniform and symmetrical to effect a variation in the characteristics of the annular element 266. It is readily apparent that for a small deflection to the center portion of the diaphragm, there will result a relatively large deformation to the peripheral portion 262 of the diaphragm, and thus maximum stress to the strain gauge and a large variation in the electrical properties of the strain element.

Figure 13:
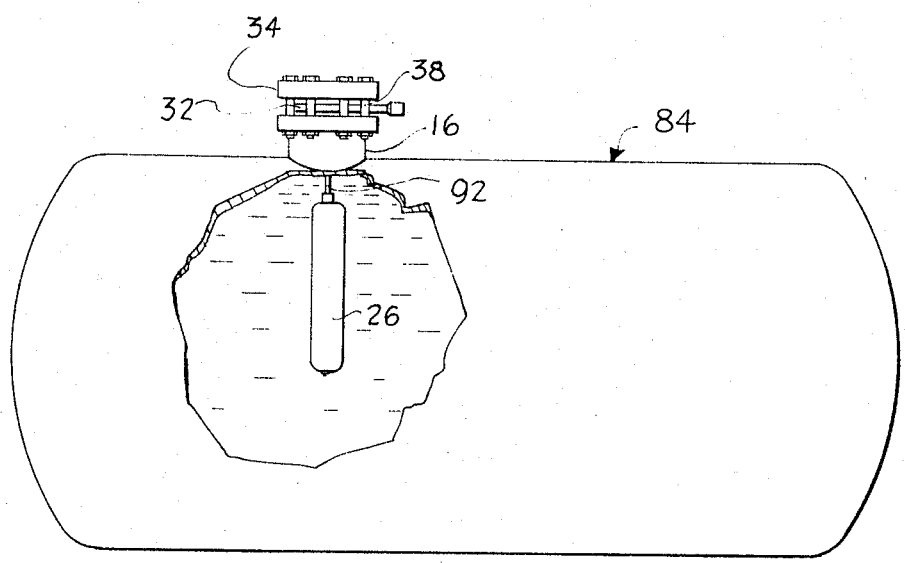
FIGURE 13 is a side elevation view partly in section and partly schematic, illustrating the manner in which the apparatus may be positioned within a vessel for level or density measurements.

The embodiment shown in FIGURE 13 illustrates the manner in which the concept of my invention may be employed within a processing vessel to measure the characteristics of a fluid therein, particularly the liquid level and density thereof. Accordingly, only the float 26 is supported by rod 92 within the vessel 84. The rod 92 may be connected to the measuring device 32 in the manner shown in FIGURE 2.

It is to be noted that in all of the embodiments of the present invention, the mechanical stress created on the strain element or elements are not only uniform, but the position of the float is concentric to the position of the strain element or elements and a small deflection of the float results in a direct force being applied to the flexure elements and a resultant true indication of the deflection of the remote indicating device. The very small deflection of the float permits guiding of the float with a very minimum effect on accuracy. Not only does this increase flexibility in design, but also permits installation in turbulent or disturbed areas or mechanically out of plumb without appreciable effects upon the accuracy of the instrument, and unlike the prior art system there is no need to provide the measuring device within plumb piping or chambers.

It is also to be noted in the various embodiments of the present invention, that means are provided for physically preventing extreme flexures to the strain element support members. For instance, in the embodiment shown in FIGURES 1 through 3, the rod 88 passes through apertures 64 and 56 at the top and bottom of the reciprocating block 82. This not only provides a guide to insure against lateral deflection and allows true reciprocation along a vertical axis extending from the float 26 to the block 82, but also prevents undue deflection at times when the float 26 is not supported within the fluid body since the block 82 will seat upon the upper surface of lower member 48. Again, excessive upper deflection is prevented by the same block 82 contacting the bottom surface of the upper member 46. Again, in the embodiment of FIGURE 4 the block 128 will seat upon the upper surface of the lower support member 122 and the bottom surface of upper member 46. A stop is provided in the embodiment of FIGURE 7 through the use of the T-shaped extension member 180 and its position within aperture 182 of the main support member 170.

It is apparent therefore that by the present invention means for measuring the force of the displacement of a float suspended in a medium the level of the medium or its density or both may be easily determined. The fluid may be a liquid or a gas. The device may be used for analogue or spot measurements as required. The signal may be used for all forms of measurement, automation and control. While the prior are designs of the electrical type were such that they required the measuring device to be external to the vessel or process conditions, the necessity for transferring the displacement force to an external detector is eliminated by the present apparatus and any errors resulting from transferring the displacement force is eliminated by the apparatus of the present invention.

While there has been shown and described and pointed out the fundamental novel features of the invention as applied to a preferred embodiment, it will be understood that various omissions and substitutions and changes in the form and detail of the devices illustrated, and in their operation may be made by those skilled in the art without departing from the spirit of my invention. It is the intention, therefore, to be limited only as indicated by the scope of the following claims.

I claim:

1. An apparatus for remotely indicating the displacement characteristics of a fluid within a fluid process vessel including an electrical indicating means positioned remote of said processing equipment and being provided with a source of electrical power said apparatus comprising: a thin walled, vertically disposed cylindrical casing, an elongated cylindrical float positioned within said cylinder and spaced slightly therefrom for limited vertical movement within said cylinder and with said cylinder wall preventing lateral deflection of said float within said cylinder, means for allowing said process fluid to pass freely within said fluid chamber formed by said cylinder about said float, a transducer including an electrical strain gauge, substantially vertical connecting rod means for directly attaching said float to said strain gauge concentrically thereof, said connecting rod means including means allowing a slight pivoting movement, whereby substantially only vertical movement of said float is transmitted to said strain gauge, and means for electrically connecting said strain gauge to said source of electrical power and said electrical indicating means whereby said strain gauge is stressed uniformly as a result of minute fluid displacement of said float to provide maximum accuracy of displacement measurement.

2. The apparatus defined in claim 1 wherein said strain gauge comprises an annular member positioned concentric of said float and cylindrical casing, said annular member including a central opening and having a pair of radial bosses extending into said opening from said inner wall, an annular block member positioned centrally of said opening and a pair of flexure elements extending from said bosses to said central block on either side thereof, said connecting rod means passing through said block and said annular member including annular guide means positioned on opposite sides of said block limiting axial movement thereof and preventing lateral movement of said block within said annular member, said flexure members being rectangular in configuration and acting to support a resistance, means for electrically connecting said resistances to said source of electrical power and said remote indicating means whereby vertical deflection of said float results in uniform, symmetrical flexing of said spaced flexure elements and varations in the resistance characteristics of said resistances.

3. The apparatus defined in claim 2 wherein said apparatus further includes a pair of resilient diaphragms, annular in form having the outer peripheries fixed to said annular block adjacent said annular opening and the inner edges fixed to said axially oscillatable block for sealing said strain resistances within cavities formed by said annular member, said block and said diaphragms.

4. The apparatus defined in claim 3 wherein means are provided for limiting the axial deflection of said block positioned centrally of said flexure members.

5. The apparatus defined in claim 2 wherein said annular member includes a single radially extended portion, said radial extension being coupled to the side walls of the process equipment for suspending said float and said transducer within said body of fluid within said process equipment.

6. The apparatus defined in claim 1 wherein said transducer comprises an annular member fixed to said casing and having a generally hollow open center, a diaphragm extending across said opening and having a strain type resistance element attached thereto and extending circumferentially about the axis of said diaphragm continuously over 360°, said resistance element including inlet and outlet leads fixed to the ends of said element resistance and means for directly connecting said float to the center of said diaphragm with said resistance element being concentric thereto whereby minute deflections of said float results in a uniform deflection of said diaphragm and a uniform change in the resistance characteristics of the electrical resistance of said strain gauge.

7. The apparatus defined in claim 1 wherein said transducer comprises a single hollow annular element having a relatively large central opening and having a cross sectional configuration in the shape of a C with a solid outer wall and an inner wall having a central opening, a diaphragm stretching across said central opening of said annular element and having a peripheral edge extending within the chamber formed between the inner and outer walls of said annular element, a resistance element circumferentially fixed to the surface of said diaphragm within said chamber and having leads connected to said remote source of power and said indicator means, means directly connecting said float to the center of said diaphragm whereby minute deflection of said float results in a relatively large physical deflection of said peripheral portion of said diaphragm and a relatively large change in the resistance characteristics of said strain element to vary the current flow to said indicator.

References Cited by the Examiner

UNITED STATES PATENTS

| 2,351,101 | 6/1944 | Brelsford | 73—313 |
| 2,460,503 | 2/1949 | Howe | 73—209 X |
| 2,580,407 | 1/1952 | Clark | 73—88.5 X |
| 2,848,892 | 8/1958 | Hoffman | 73—88.5 X |
| 3,168,718 | 2/1965 | Swartz | 73—88.5 X |

LOUIS R. PRINCE, *Primary Examiner.*

FRANK H. THOMSON, *Assistant Examiner.*